(12) United States Patent
Kinsley et al.

(10) Patent No.: US 6,397,677 B1
(45) Date of Patent: Jun. 4, 2002

(54) PIEZOELECTRIC ROTATIONAL ACCELEROMETER

(75) Inventors: Norton Kinsley, Lockport; Michael D. Insalaco, Niagra Falls, both of NY (US)

(73) Assignee: Kistler Instrument Corporation, Amherst, NY (US)

( * ) Notice: Subject to any disclaimer, the term of this patent is extended or adjusted under 35 U.S.C. 154(b) by 17 days.

(21) Appl. No.: 09/587,974

(22) Filed: Jun. 6, 2000

(51) Int. Cl.[7] .......................... G01P 15/08; H01L 41/08
(52) U.S. Cl. ..................... 73/514.34; 310/329; 310/333
(58) Field of Search ........................... 73/514.34, 493, 73/514.36, 514.37, 862.043, 862.638, 654, 651; 310/329, 333

(56) References Cited

U.S. PATENT DOCUMENTS

| 4,314,481 A | | 2/1982 | Wolfer et al. .................. 73/781 |
| 4,586,377 A | * | 5/1986 | Schmid ..................... 73/514.34 |
| 4,996,878 A | | 3/1991 | Kübler ......................... 73/510 |
| 5,402,684 A | | 4/1995 | Engeler et al. ................ 73/794 |
| 5,427,516 A | | 6/1995 | Bader et al. ................. 425/149 |
| 5,512,794 A | | 4/1996 | Kübler et al. ................ 310/329 |
| 5,677,487 A | * | 10/1997 | Hansen ..................... 73/514.34 |
| 5,847,278 A | * | 12/1998 | Judd ....................... 73/514.34 |

OTHER PUBLICATIONS

"The Development of Six–Axis Arrayed Transducer"—Shumin Li, David L. Brown, Armin Seitz and Mike Lally.

* cited by examiner

Primary Examiner—Helen Kwok
(74) Attorney, Agent, or Firm—Barnes & Thornburg

(57) ABSTRACT

A rotational accelerometer using piezoelectric material, preferably quartz, in a shear orientation. Piezoplates and conducting seismic masses, each having bores therethrough, are bolted to posts that are symmetrically mounted to a body in such a manner that the bolt passes through the piezoplates but does not make contact. The accelerometer can be assembled as a single-axis accelerometer by mounting a pair of posts symmetrically about the body along the measured axis; additionally, the accelerometer may be assembled as a double or triple axis accelerometer by symmetrically mounting additional pairs of posts to the body. The total weight of the seismic masses and the crystals of the shear-type accelerometer halves should be equal. The invention sets forth a novel rotational accelerometer that reduces or eliminates the need for signal-processing electronics.

26 Claims, 3 Drawing Sheets

PIEZOELECTRIC ROTATIONAL ACCELEROMETER

BACKGROUND AND SUMMARY OF INVENTION

The present invention relates generally to accelerometers employing piezoelectric materials, and more specifically to shear piezoelectric sensors responsive to acceleration or vibration.

The acceleration experienced by a rotating member or structure is often a very important parameter to consider during a system design. For example, an automobile crash imparts tremendous energy to the occupants and significant rotational inertia is also present. Mechanical structures deform dynamically at resonant frequencies and the resulting stresses can cause tremendous damage.

A Finite Element Analysis (FEA) is typically employed to form a mathematical model of the system. This analysis relates the deformation at one surface of a discrete elemental section to the surface deformation at opposing and adjacent elemental surfaces by an appropriate stress strain relationship. As surface displacements and rotations are considered in the analysis where each of them represents a degree of freedom of the system. Attachments such as welds, joints, bolts or the like can introduce significant error into the FEA model because the required stiffness estimates are generated from engineering judgement and empirical data. Therefore, a dynamic measurement or analysis must be performed when the results may have critical consequences.

An experimental study such as the above FEA is typically performed using only linear accelerometers. A spatially narrow array provides a means to estimate rotations; however, measuring rotations still presents a great deal of difficulty at interfaces such bolted joints. These interfaces often have large relative rotation but vary minimal linear displacement and therefore a method of measuring rotational acceleration is very important. Unfortunately, measuring this dynamic rotational data has not been straightforward due to the lack of convenient and accurate rotational accelerometers.

A variety of techniques have been attempted which use a pair of spatially separated, sensitivity-matched linear accelerometers to estimate and determine rotational acceleration. When linear accelerometers are located on a fixture at a prescribed distance apart, the output signal difference between them is used to estimate rotational acceleration. However, a problematic fact is the prevailing levels of output signal generated by the translational movement tends to overshadow those due to rotational motions. This makes the differencing operations above liable to serious error. See, D. J. Ewens, Modal Testing: Theory and Practice; Research Studies Press Limited 1984.

It is the purpose of the present invention to provide a transducer element or accelerometer which allows the accurate measurement of angular acceleration which may be suitable for vehicle impact testing, though not limited solely for this.

Manufacturers of accelerometers have more control over the sensitivity matching process and can incorporate technologies which have the qualities required by the design constraints of a rotational accelerometer. The design of an accelerometer always involves the optimization of a parameter compromise; thus, there is not a single accelerometer that fulfills all realms of acceleration measurement.

Application specific designs are tailored for their best fit into the field of interest. For example, Experimental Modal Analysis (EMA) is a field of study which predominately incorporates a sensor well-suited for low frequency ranges (less than 1000 Hz) and controlled environmental conditions. A piezoelectric bimorph is perhaps best for this set of conditions.

A bimorph is formed from two piezoelectric plates which are inversely polarized, then sandwiched and fused together, then sliced to form a rectangle. The piezoelectric element of a bimorph serves as a seismic mass since it is mounted in a manner showing flexure when exposed to acceleration. When the bimorph is packaged in a cantilever beam arrangement, the rectangular shape results in an extremely flexible seismic system, in its sensitive axis, as compared to the two orthogonal directions defining planes transverse thereto. Even though the seismic system is not extremely stiff, as is typical to most accelerometers, the obtainable frequency response is well-suited for EMA.

The typical bimorph piezoelectric accelerometer is symmetric about a central fulcrum. Any rotation about this central fulcrum generates equal magnitude, but inverted, charges from each of the symmetric beams and therefore a self-cancellation occurs. Central rotations flex the symmetric halves in opposite directions, while linear acceleration creates similar bending on both sides of the fulcrum. When the beams are arranged to have opposite polarity, however, the charges then sum to provide an output proportional to angular acceleration about the fulcrum. Such a system is shown, for example, in U.S. Pat. No. 4,996,878.

The prior art beam-type accelerometer, as disclosed in U.S. Pat. No. 4,996,878, was capable of detecting rotational acceleration. The beam-type design required electrical contacts or leads interconnecting each the stressed faces of the beams. Each of these leads was connected to a miniature charge amplifier and a miniature multiconductor cable. The low impedance voltage outputs from each of the beams are then connected to a remote signal conditioner, which has facility for powering the sensor's internal electronics and processing the independent signals from the faces of the beams. Additionally, the prior art required precision adjustable potentiometers to precisely fine-tune the sensitivity of the signal from each face in order to create an exact match to its counterpart. One summing amplifier and one differencing amplifier would then provide as output the sums and differences of the sensed charges. These outputs would be proportional to the linear and angular acceleration sensed. Thus, the prior art required post-processing electronics in order to obtain readable figures. The addition of these post-processing components necessarily introduces numerous aspects of error into the design.

As alluded to above, the bimorph beam-type accelerometer required precise sensitivity matching of the beams. This is not a simple task because even a minor difference in sensitivity can introduce excessive error. It has been shown that an error in sensitivity matching as small as one fourth of one percent can contribute 12.3% error in the computed rotational acceleration even on a simple cantilever beam structure. See, Shumin Li, David L. Brown, Armin Sietz, Milte Lally's "The Development of Six-Axis Arrayed Transducer" Proceedings International Modal Analysis Conf. 1994. Therefore, it is clear that producing an accurate rotational accelerometer from commonly available commercial hardware is very difficult, yet of vital importance in design.

Moreover, bimorph beams necessarily involve fusing two distinct crystals together with a type of epoxy. The introduction of this epoxy into the crystalline structure, or even a slight glitch in the epoxy attaching the beams to the fulcrum, will also introduce another possibility of error, and may further require frequent recalibration.

There are several other shortcomings to the beam-type bimorph design. The beam-type bimorph design is not well-suited for applications outside of EMA. A preferred design for other higher frequency or higher-impact applications, such as in crash testing, is in the shear-type accelerometer. For higher-frequency applications, accelerometers utilizing the shear principle have some special advantages over beam-type bimorph accelerometers.

The shear-type rotational accelerometer is assembled in much the same way as the bimorph beam-type accelerometer. A pair of accelerometers are aligned with polarities reversed such that their axes of sensitivity are parallel and spaced-apart. A first axis is thereby formed to be parallel to, and running between, the axes of sensitivity. A rigid connection extends between the two accelerometers, and thereby defines a second axis that runs perpendicular to each axis of sensitivity, and consequently perpendicular to the first axis.

A typical model of a shear-type linear accelerometer is described in U.S. Pat. No. 5,512,794 to Kubler, et al., shown in FIG. 1 as prior art, known as a K-Shear accelerometer from Kistler Instrument of Amherst, N.Y. The K-Shear accelerometer is sturdy and well-suited for high-frequency testing, because the bending stresses/strains are greatly reduced due to the configuration of the crystals and seismic masses. Because the potential for error is greatly reduced, the K-Shear is well-suited for accurately detecting and measuring acceleration in high-frequency applications.

In order to give a full understanding of the present invention, the disclosure of the '794 Kubler et al U.S. Patent is hereby incorporated by reference.

The post, the piezoplates and the masses each have a similarly-sized bore passing through. The bores in the post, the piezoplates, and the masses are aligned so that a bolt can pass through without making contact with the piezoplates or the post or z-axis.

The K-Shear accelerometer provides a novel means of detecting linear acceleration in the direction of the post.

Experience has shown that quartz is a preferred piezoelectric material because its piezoelectric qualities are substantially constant, and remain substantially constant over time. Of course, other piezoelectric materials, including but not limited to ceramics or even bimorph materials, have been used.

The piezoelectric coefficient of quartz is absolutely relatively constant and does not change very little, if at all. Accordingly, a piezoelectric accelerometer was fixed distance between the seismic masses will not affect the capacitance as originally calibrated, the accelerometer would produce accurate reading without having to bear the expense of re-calibration.

Additionally, experimentation has shown that the charge output of a quartz accelerometer is mass-dependent and does not depend upon the geometric configuration of the crystal. Thus, assembly of an accurate shear quartz rotational accelerometer requires one to carefully determine that the total mass of the crystals and assure the seismic masses is equal to the combined mass of the counterpart crystal and seismic mass. The dimensions of the crystals will not affect accuracy of the accelerometer.

Even though the configuration of the crystals will not affect the piezoelectric qualities of the crystal, the configuration of the crystals will affect the signal output to some degree. Varying thicknesses of crystal between seismic masses will therefore create varying capacitance between the seismic masses. The configuration of the crystals, therefore, will affect the capacitance between the two seismic masses which alters rotational sensitivity but not accuracy.

As mentioned above, the output signal will be proportional to the rotational acceleration about the measured axis. The variance in capacitance, therefore, will be a parameter that will affect the constant of proportionality between the output signal and the acceleration. Once this proportionality constant is determined—hence, the accelerometer is calibrated —then the shear-type rotational accelerometer will remain remarkably accurate.

The K-Shear accelerometer has proven to be very reliable, durable and accurate. To date, however, this design has not been used independently to determine rotational acceleration. The instant invention intends to improve upon the current art by providing an accurate and dependable shear-type rotational accelerometer.

FIRST EMBODIMENT: SINGLE-AXIS ROTATIONAL ACCELEROMETER

The rotational accelerometer has first and second spaced-apart linear accelerometers halves aligned to have parallel axes of sensitivity. Each of the first and second linear accelerometer halves has at least one piezoplate and at least one seismic mass firmly clamped to the piezoplate.

A rigid connection extends between the linear accelerometer halves to define a first axis perpendicular to each of the axes of sensitivity. The polarity of the linear accelerometer halves is reversed such that each will output a signal of like polarity when subjected to rotation about a first measured axis that is perpendicular to the first axis.

The rigid connection comprises a body, a first post extending substantially orthogonally from the body, a second post extending from the body substantially collinear to the first post. The first linear accelerometer half is connected to the first post and comprises at least one first piezoplate and at least one first mass, and the second linear accelerometer half is connected to the second post and comprises at least one second piezoplate and at least one second mass.

The first post, the first piezoplate, and the first seismic mass each have a first bore therein, and the second post, the second piezoplate, and the second seismic mass each have a second bore therein. A first metal bolt extends through each of the first bores to clamp each of the first piezoplates and first seismic masses to the first post in such a way as to ensure that the first bolt contacts neither the first piezoplates nor the first post.

A second metal bolt passes through the second bore to clamp each of the second piezoplates and second seismic masses to the second post in such a way as to ensure that the second connection support contacts neither the second piezoplates nor the second post. Preferably, each bolt has a smaller diameter than the diameter bores on its respective post so as to create a non-contact annulus therebetween.

There is an electrical connection between the first bolt and a first electric terminal, and an electrical connection between the second bolt and the first electric terminal, as well as an electrical connection between the rigid connection and a second terminal, such that the second electrical terminal is a ground and an electrical instrument may read the signal from between the first and second electric terminals. Impedance buffering electronics are included in the practical design just prior to the first electrical terminal for user convenience.

Each piezoplate is a shear type piezoplate, comprising stable quartz, having nearly equal dimensions. The rigid connection is metal. The body and the posts may be formed as a monolithic, one-piece, metal structure. Care should be taken to insure that seismic mass and piezoplate of each accelerometer half have exactly the same mass. A common housing encloses the first and second accelerometer halves.

SECOND EMBODIMENT: DOUBLE AXIS ROTATIONAL ACCELEROMETER

A double-axis rotational accelerometer may be constructed by adding third and fourth spaced-apart linear accelerometer halves, aligned so that the first, second, third and fourth accelerometers halves have mutually parallel axes of sensitivity. Each of the third and fourth linear accelerometer halves have at least one piezoplate and at least one seismic mass firmly clamped to the piezoplate.

The rigid connection between the third and fourth linear accelerometer halves defines a second axis perpendicular to the first axis. The polarity of the third and fourth linear accelerometer halves is reversed such that each half will output a signal of like polarity when subjected to rotation about the second axis.

The rigid connection has a body connected to the first and second linear accelerometer halves and a third post extending from the body and mutually perpendicular to the body and the first post as well as a fourth post extending from the body substantially collinear to the third post.

The third linear accelerometer is connected to the third post and comprises at least one third piezoplate and at least one third seismic mass, and the fourth linear accelerometer half is connected to the fourth post and comprises at least one fourth piezoplate and at least one fourth seismic mass.

The third post, the third piezoplate, and the third seismic mass each have a third bore therein. Similarly, the fourth post, the fourth piezoplate, and the fourth seismic mass each have a fourth bore therein. A third metal bolt extends through each of the third bores to clamp each of the third piezoplates and third seismic masses to the third post in such a manner as to ensure that the third metal bolt contacts neither the third piezoplates nor the third post. In like manner, a fourth metal bolt passing through to clamp each of the fourth piezoplates and fourth seismic masses to the fourth post in such a manner as to ensure that the fourth bolt contacts neither the fourth piezoplates nor the fourth post.

The double-axis accelerometer has an electrical connection between the third metal bolt and a third electric terminal and an electrical connection between either the fourth mass and the third electric terminal. There is also an electrical connection to a second electric terminal such that the second electric terminal is a ground, which enables an electrical instrument to read the signal from between the second and third electric terminals.

The third and fourth posts are metal and are electrically connected to one another. In order to accomplish this connection, the body, as well as the first, second, third and fourth posts can be formed as a monolithic, one-piece metal structure.

THIRD EMBODIMENT: TRIPLE-AXIS ROTATIONAL ACCELEROMETER

A third pair of linear shear accelerometer halves may be added in order to create a rotational accelerometer capable of measuring rotation about a third axis. This embodiment comprises each of the elements of the double axis rotational accelerometer, and adds fifth and sixth spaced-apart linear accelerometer halves, aligned to have parallel axes of sensitivity, wherein each of the fifth and sixth linear accelerometer halves having at least one piezoplate and at least one seismic mass firmly clamped to the piezoplate. A rigid connection between the fifth and sixth linear accelerometer halves, thereby defining a third axis mutually perpendicular to the first and second axes. The polarity of the fifth and sixth linear accelerometer halves is reversed such that each accelerometer half will output a signal of like polarity when subjected to rotation about the second axis.

The body is connected to the first, second, third and fourth linear accelerometer halves, and a fifth post extends from the body mutually perpendicular to the body and the first and third posts. A sixth post extends from the body substantially collinear to the fifth post.

The fifth linear accelerometer half is connected to the fifth post and comprises at least one fifth piezoplate and at least one fifth seismic mass; similarly, the sixth linear accelerometer half is connected to the sixth post and comprises at least one sixth piezoplate and at least one sixth seismic mass.

The fifth post, the fifth piezoplate, and the fifth seismic mass each have a fifth bore therein. The sixth post, the sixth piezoplate, and the sixth seismic mass each have a sixth bore therein. A fifth metal bolt extends through each of the fifth bores and clamps each of the fifth piezoplates and fifth seismic masses to the fifth post such that the fifth metal bolt contacts neither the fifth piezoplates nor the fifth post. A sixth metal bolt passes through the sixth bores and clamps each of the sixth piezoplates and sixth seismic masses to the sixth post in such a way as to ensure that the sixth bolt contacts neither the sixth piezoplates nor the sixth post.

The triple-axis embodiment requires an electrical connection from the fifth bolt to a fourth electrical terminal and an electrical connection from the sixth bolt to the fourth electrical terminal, as well as an electrical connection from the fifth post to the second electric terminal, which is a ground terminal. This connection enables an electrical instrument to read the signal from between the fourth and second electric terminals.

Preferably, the fifth and sixth posts are metal and electrically interconnected with one another. In order to accomplish this connection, the body and each of the posts are a monolithic, one-piece metal structure.

The invention further comprises a method of constructing the rotational accelerometer halves herein disclosed. The method includes aligning a pair of piezoelectric accelerometer halves to have polarly opposed yet parallel axes of sensitivity, connecting at least one pair of piezoelectric accelerometer halves with a rigid connection, electrically connecting the piezoelectric accelerometer halves to a common port, and selecting a ground. Once constructed, the rotational accelerometer is calibrated by subjecting the accelerometer to a plurality of known rotational accelerations.

The piezoelectric accelerometer halves are shear-type linear accelerometer halves, each having at least one shear-type piezoplate and one seismic mass. It is vitally important to construct the rotational accelerometer halves so that the total mass of the plates, bolt and seismic masses of one accelerometer half equals the total mass of the plates, bolt and the seismic masses of an opposing accelerometer half.

The rigid connection, which may be formed as a one-piece, monolithic metal structure, should comprise a body and at least one pair of collinear posts extending from the body to each of the respective accelerometer halves.

The invention thus provides high precision and simple design for accelerometers halves having multiple-axis applications.

Although the present invention has been described and illustrated in great detail, it is to be clearly understood that the same is by way of illustration and example only, and is not to be taken by way of limitation. The spirit and scope of the present invention are to be limited only by the terms of the appended claims.

DETAILED DESCRIPTION OF THE PREFERRED EMBODIMENTS

Figure 1:
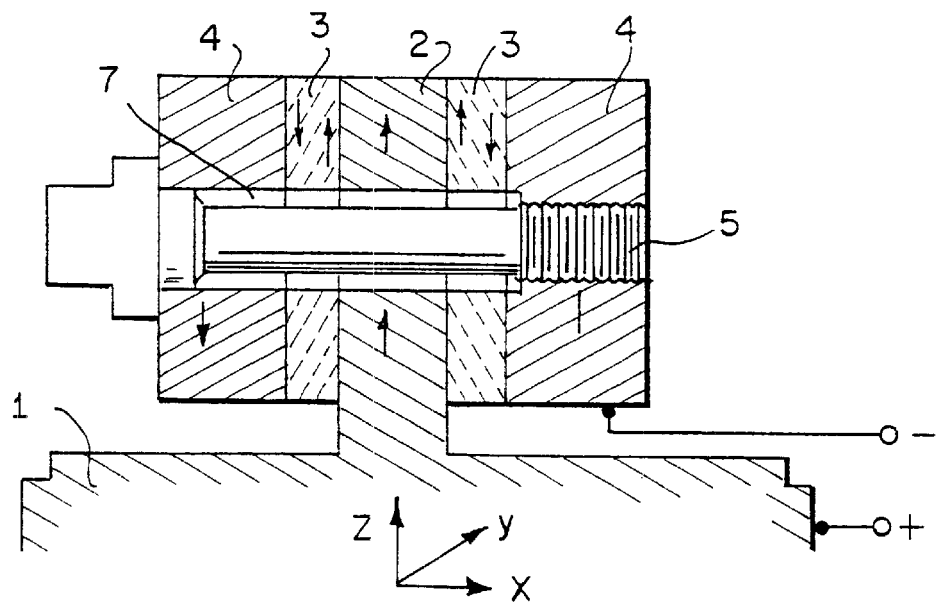
FIG. 1 is a cross-sectional view of an accelerometer half of the prior art.

FIG. 1, shown as prior art, has one through-bolt 5 that extends from one of the masses 4, passing through piezoplates 3 and center post 2 without touching them and is threadably received in the other mass 4. The annulus space 7 between bore and through-bolt 5 avoids mechanical and electrical contact between through-bolt 5 and piezoplates 3 and center post 2. This contact separation connects the two masses 4 into a solid unit exerting only shear forces on the piezoplates 3. No possible bending moments will occur since the through-bolt 5 has no securement to pivot about. Thus all forces parallel to the Z axis remain parallel to the Z axis and are not converted to moments by the through-bolt 5. All compressional forces introduced by the masses 4 and through-bolt 5 are only parallel to the axis of the through-bolt 5 and the bores even the presence of forces parallel to the Z axis.

Figure 2:
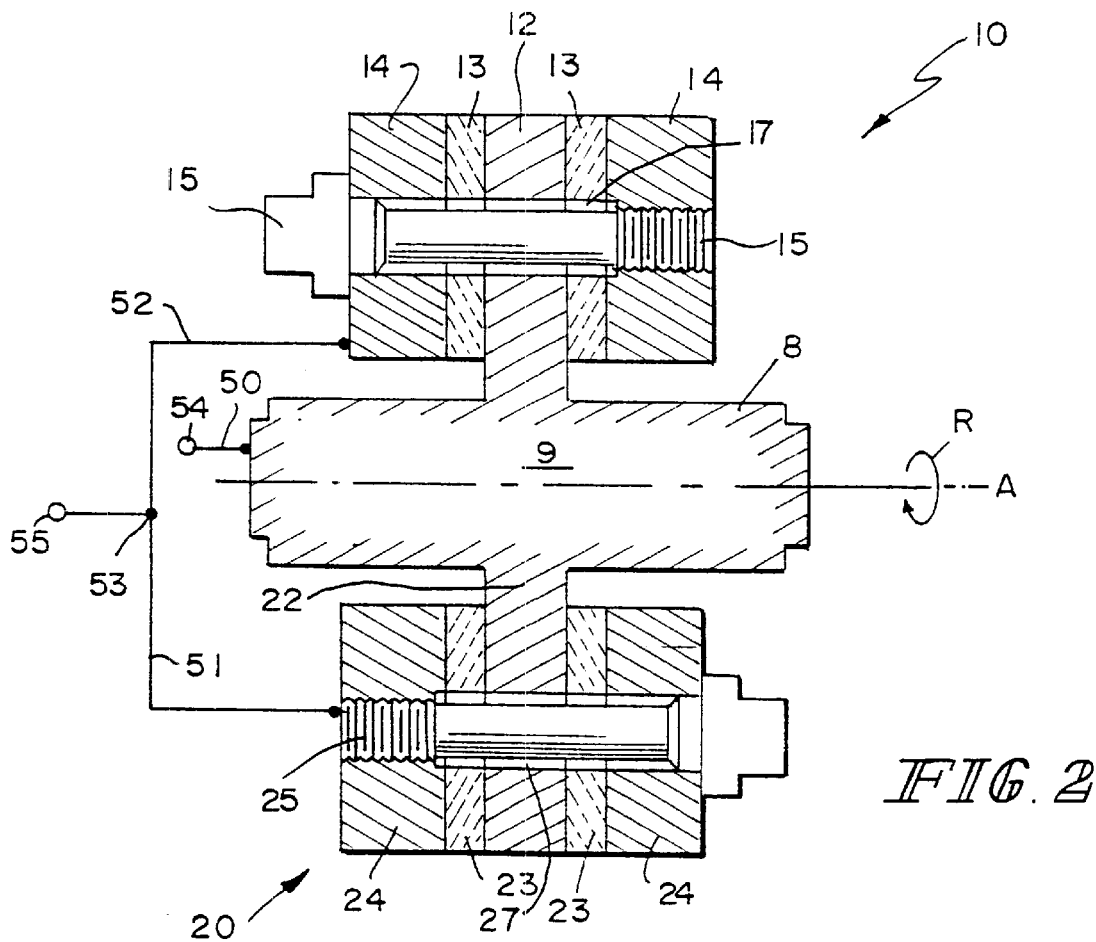
FIG. 2 is a cross-sectional view of an embodiment of the rotational accelerometer half that is able to measure and detect rotational acceleration about a single axis.

FIG. 2 depicts a shear rotational accelerometer half capable of measuring and detecting rotational acceleration about axis A. The accelerometer half comprises a pair of spaced-apart linear accelerometer halves 10, 20. A rigid connection 9 connects the two accelerometer halves 10, 20. The rigid connection 9 comprises a body 8 and posts 12 and 22. As shown in FIG. 2, the rigid connection 9 is a generally rectangular solid shape. Of course, other suitable configurations for the rigid connection 9 are possible.

A first post 12 extends substantially orthogonally from the body 8 and has a first bore therein. A second post 22 extends substantially colinear to the first post 12 from the rigid connection and has a second bore therein. Additionally, the rotational accelerometer half has at least one first piezoplate 13, each first piezoplate 13 comprising a first bore. Additionally, at least one second piezoplate 23 having a second bore therein is included. Additionally, the accelerometer half has at least one first mass 14, each having therein a first bore extending therethrough, as well as at least one second mass 24 having a second bore extending therethrough. The accelerometer half further comprises a first bolt 15 passing through each of the first bores and thereby clamping the first mass 14 and the first piezoplate 13 to the post 12. It is important to note that the bolt 15 passes through the piezoplate 13 and post 12 without contacting either. As such, a gap 17 will result separating the bolt 15 from each of the piezoplate 13 and post 12.

In like and symmetrical manner, a second bolt 25 passes through each of the second bores in order to clamp the second mass 24 to the second piezoplate 23. Analogously, bolt 25 passes through each of the second bores without making contact with the piezoplates 23 or the post 22, thereby forming a gap 27.

As shown in FIG. 2, the bolts, 15, 25 are configured such that one end is threaded while the other has a head which abuts one of the masses. Of course, any alternative design for the bolts which would achieve the clamping of the masses and piezoplates to the posts without making contact with the piezoplates or the post would work equally well.

In order to determine angular rotation, the first piezoplates 13 and second piezoplates 23 are shear type quartz piezoplates mounted with parallel axes of sensitivity, and polarly opposite to one another. Viewing FIG. 2, in event the accelerometer half as shown experiences rotation R about axis A, the first piezoplates 13 will rotate towards the viewer (out of the plane defined by the page begin viewed), while plates 23 will be moving away from the viewer (into the page). Consequently, piezoplates 13 will experience shear force in the polar opposite direction as the second piezoplates 23. Thus, in the event they are mounted with like polarity with respect to an axis perpendicular to axis A, a pure rotation of R about axis A will always result in near-zero total piezoelectric charge because the forces will be nearly equal and opposite because the mass, therefore force, acting on each half is exactly equal therefore, the equal but opposite charges cancel each other. However, if the plates 13 and 23 are mounted polarly opposite to one another with respect to an axis perpendicular to axis A, their reading, when subject to rotation R about axis A, will sum and provide a signal proportional to the angular acceleration about axis A.

The preferred piezoelectric material to comprise the plates is quartz. Quartz has unchanging piezoelectric characteristics. As such, the piezoelectric qualities will not change over time which means that once calibrated, the accelerometer half will retain accuracy.

First piezoplates 13 should have the same mass as second piezoplates 23. Not only is this required to symmetry purposes, the charge output from the quartz is mass-dependent. It has been found through experimentation, and confirmed by theory, that equal total masses—that is, the mass of the crystal plus the seismic mass and bolt will output equal electrical charges notwithstanding any differences in configuration.

Even though the piezoelectric characteristics of a quartz crystal are independent of the shape of the crystal, the shape of the crystal will have an effect on the capacitance. However, because the plates are clamped to the crystal to remain a constant distance apart, the capacitance will remain constant. Thus, once the instrument is calibrated, it will remain accurate potentially indefinitely because the parameters affecting the output (i.e., mass of the crystals, the mass of the seismic masses, mass of bolts, and the capacitance between surfaces bounding the crystal) will be constant. A detailed explanation follows.

Figure 5:
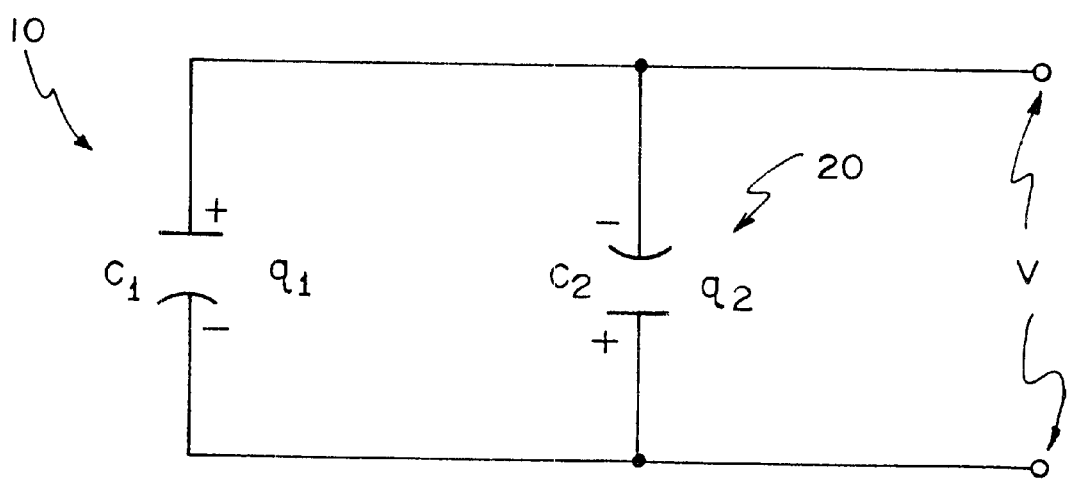
FIG. 5 is an electrical schematic of the embodiment shown in FIG. 2.

FIG. 5 presents an electrical schematic of the rotational accelerometer. Each of the capacitors shown in the diagram represent sone of the accelerometer halves 10, 20. The voltage V sensed across the parallel capacitor circuit is directly related to the respective charge q1 and q2 induced by each of the piezoelectric linear accelerometer halves 10, 20. Each accelerometer half will have its capacitance c1 anc c2.

The voltage V is related, in general, to capacitance and charge by the following equation:

$$V=Q/C.$$

Specifically regarding the schematic set forth in FIG. 5, then, the following identities apply:

$$Q=q1+q2; \text{ and, } C=c1+c2$$

Substituting these identities into the general equation results in the following relation between voltage, capacitance, and charge:

$$V=(q1+q2))/(c1+c2)$$

Because the capacitance c1 and c2 will remain constant, the voltage V is directly proportional to the input variables q1 and q2.

In this embodiment, it is preferred that the body 8, first post 12 and second post 22 each be constructed of metal. Additionally, these three parts maybe formed as a single, monolithic unitary structure. In doing so, not only is manufacture and assembly simplified, the body and each of the posts become electrically connected. As such, a potential experienced at any point on the second post 22 will be equal to the potential on any point of body 8, and likewise equivalent to the potential on any point of first post 12.

The masses 14 and 24 are preferably made of metal or any other electrically conductive material. Additionally, first bolt 15 and second bolt 25 are likewise made of metal as well. As such, the charge experienced at any point on either first mass 14 will be equal to the charge experienced on any point of the first bolt 15.

Analogously, the electrical charge present at any point on either second mass 24 2ill be equal to the charge present at any point of second bolt 25. Ideally, the charge present at first mass 14 should be equal to the charge at second mass 24.

An electrical lead 52 extends from the first bolt 15 to a first terminal 55. Analogously, an electrical lead 31 extends from second bolt 25 to the first terminal 55. As shown, each of the leads 51, 52 may be connected first to a coupler 53 that extends to the first terminal 55; in the alternative, the leads 51, 52 may directly connect to the first terminal 55.

As noted before, on each of the bolts there is the same charge as the masses 14, 24 that it clamps. As such, the leads 51, 52 may also emanate from masses 14, 24 instead. The embodiment wherein the electrical leads emanate from the masses 14, 24, however, is not shown.

An electrical lead 50 extends from the body 8 and connects to a second terminal 54. The second terminal 54 represents a ground terminal.

As shown in FIG. 2, a potential difference will exist between terminals 55 and 56. As shown in FIG. 5, the detected voltage V will be proportional to the rotational acceleration detected. An internal impedance converting electronic circuit can be incorporated between terminal 55 and coupler 53 to transform the high impedance voltage into an environmentally immune low impedance voltage prior to the exiting the sensor.

DOUBLE AXIS ACCELEROMETER

Figure 3:
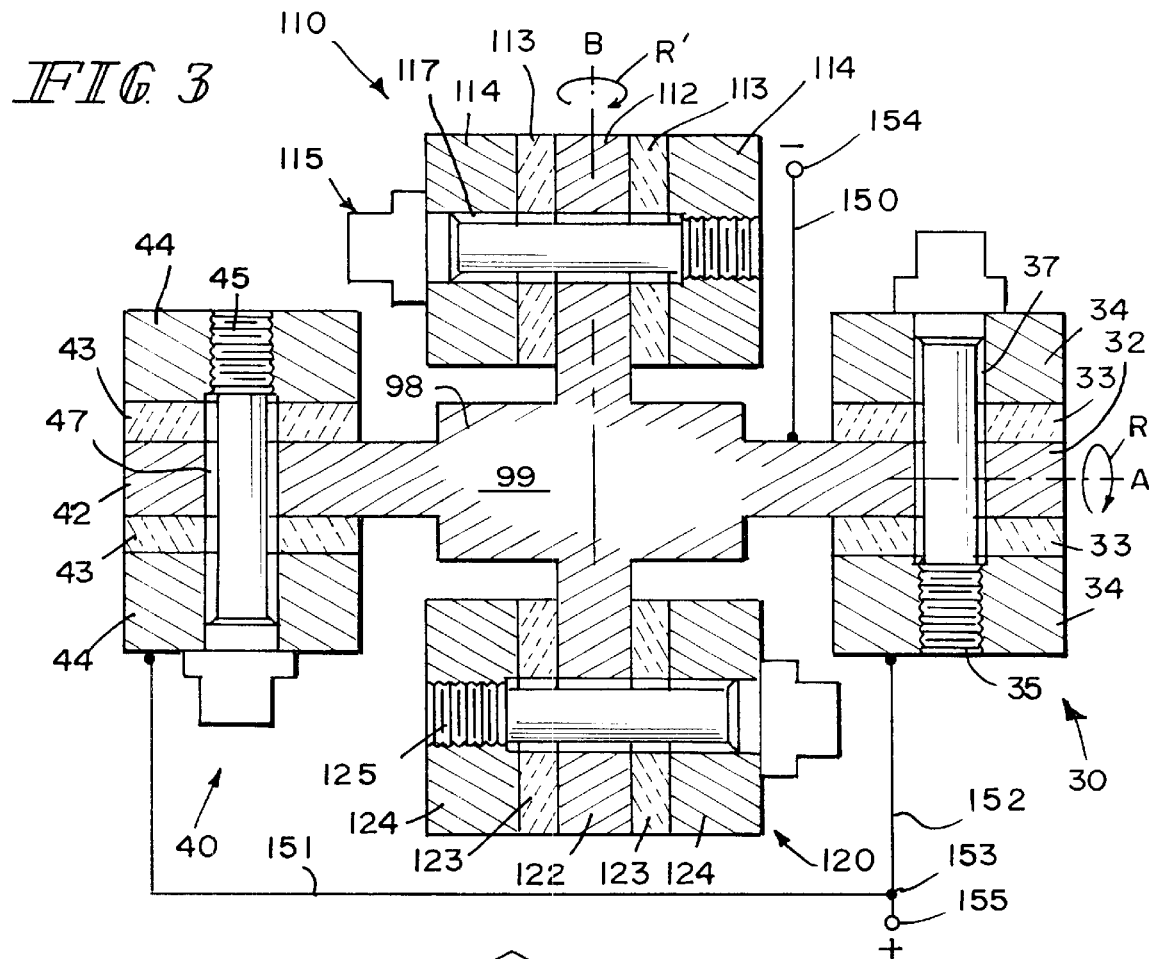
FIG. 3 is a cross-sectional view of an embodiment of the rotational accelerometer half that is able to measure and detect rotational acceleration about two perpendicular axes.

Referring to the embodiment depicted in FIG. 3, please note that this embodiment is similar in many ways to the embodiment in FIG. 2. However, this embodiment allows one to observe, detect and measure acceleration about two perpendicular axes. Specifically, this embodiment allows one to detect and determine rotation R about axis A as well as rotation R'about axis B. This embodiment, however, will be separated into two distinct substructures.

The first substructure comprises a pair of spaced-apart linear accelerometer halves 110, 120 and the second comprises a pari of spaced-apart linear acceleometer halves 30, 40.

For the substructures, the body 98 and the first post 112, second post 122, third post 32 and fourth post 42 are all made of metal and are mutually connected. Indeed, one may even perform this embodiment of FIG. 3 as a monolithic, unitary metal structure. Any point on body 98 will experience the same electrical potential as any point on any of the first 112, second 122, third 32 or fourth 42 posts.

For the sake of simplicity, the electrical leads and connections pertaining to the connection of masses 114, 124 and the posts 112, 122 as well as the leads and terminals as shown in FIG. 2 are also present in FIG. 3. However, these connections were omitted in order to make a drawing of FIG. 3 easier to understand and visualize.

Third and fourth post 32 and 42, respectively extend generally orthogonally from the body 98 mutually perpendicular to the body 98 and first post 112. Each of the third 32 and fourth 42 posts bears a bore therein for the passage of a through-bolt 35, 45 therethrough. At least one third piezoplate 33 also bears a bore there through, enabling through 35 to pass through the third post 32 as well as the bore in the third piezoplate 33, and thereby clamp third masses 34 and third piezoplates 33 to third post 32.

In much the same way, fourth piezoplates 43 and fourth masses 44 are clamped to fourth post 42. It should be noted that fourth post 42 extends from the body 98 in such a way as to be substantially colinear with third post 32.

Third, piezoplate 33 should bear opposite polarity to the fourth piezoplate 43. A discussion of the significance of the alignment of polarity has been set forth above.

Each of the bolts 35, 45 are constructed from metal. Additionally, the masses 34, 44 are likewise constructed of metal, but may be made of any electrically-conducting material.

When subjected to rotation R' about axis B, bolt 45 will tend to move toward the viewer while bolt 35 will tend to move into the page. As such, piezoplate 43 subjected by mass 44 will yield a positive charge resulting from the inertial shearing from such a rotation. Analogously, third piezoplate 33 will typically be exposed to an equal and opposite shear force. Consequently, it is again important to mount piezoplates 33 and 43 to be of opposing polarity.

Third mass 34 is connected via electrical lead 52 to an electrical coupler 53. In like manner, fourth mass 44 (or fourth bolt 45, as shown in FIG. 3) is electrically connected via electrical lead 151 to electrical coupler 153. Coupler 153 terminates at a fifth electrical terminal 155. Additionally, an electrical lead 150 extends from third post 32 to a third electrical terminal 154. Impedance converting electronics may also be incorporated prior to terminal 155.

The voltage across terminals 154 and 155 will be proportional to the angular acceleration about axis B.

TRIPLE AXIS ACCELEROMETER

Figure 4:
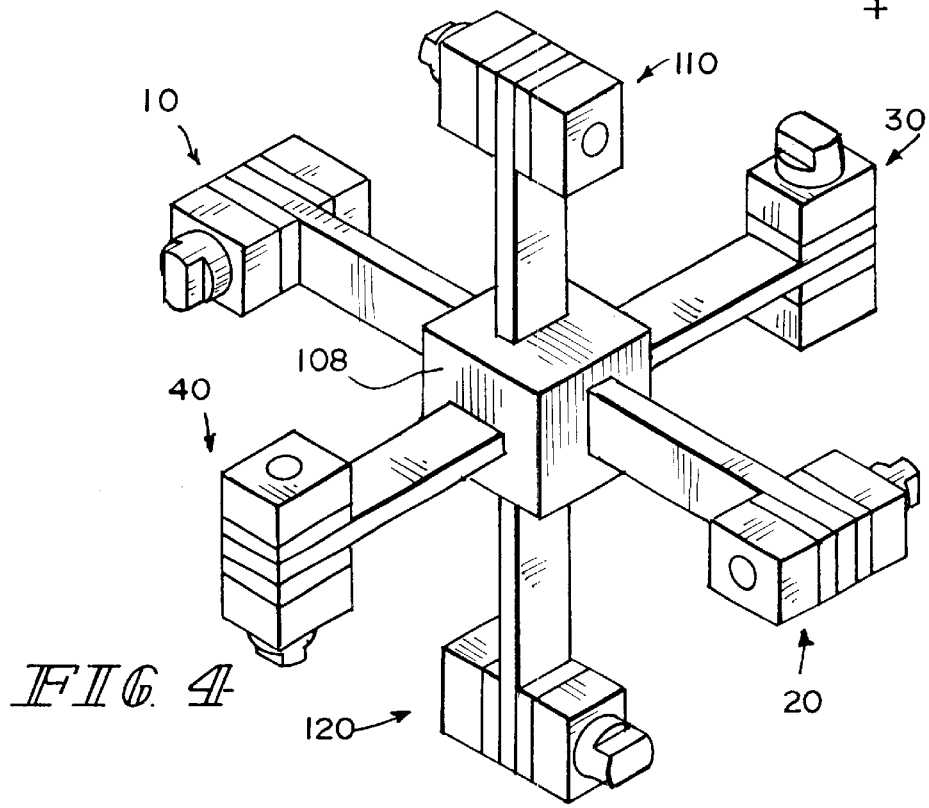
FIG. 4 is a perspective view of an embodiment of the rotational accelerometer half that is able to measure and detect rotational acceleration about three perpendicular axes.

Referring to the embodiment depicted in FIG. 4, this comprises each of the elements of the single and double axis rotational accelerometers 10, 20, 30, 40, 110, and 120 with each of the rotational axis being mutually perpendicular to the other and lack of the rotational accelerometers 10, 20, 30, 40, 110, 120 connection via body 108.

The invention thus provides high precision and simple design for accelerometers halves having multi axis application.

Although the present invention has been described and illustrated in great detail, it is to be clearly understood that the same is by way of illustration and example only, and is not to be taken by way of limitation. The use of the K-Shear linear accelerometer half of FIG. 1 as the two or four accelerometer halves is mainly uses as an example. Other pairs of shear type spaced accelerometer halves may be used. The spirit and scope of the present invention are to be limited only by the terms of the appended claims.

We claim:

1. A rotational accelerometer comprising:
   first and second spaced-apart linear accelerometers each having first and second piezoplates and corresponding first and second seismic mass clamped to a corresponding post; the piezoplates of each linear accelerometer having parallel first axes of sensitivity and being electrically connected to be sensitive to linear acceleration along the parallel axes;
   each of the post being connected to a body so that the first axes of both linear accelerometers are parallel; and
   the polarity of the linear accelerometers being opposed and electrically connected to be sensitive in combination to rotational acceleration about a second axis perpendicular to the first axes.

2. The accelerometer of claim 1, wherein the posts of the first and second linear accelerometers are substantially collinear and extend substantially orthogonally from the body.

3. The accelerometer of claim 1, wherein
   the post, the piezoplates, and the seismic masses of the first linear accelerometer each have a first bore therein;
   the post, the piezoplates, and the seismic masses of the second linear accelerometer each have a second bore therein;
   a first metal bolt extending through each of the first bores and clamping each of the piezoplates and seismic masses to the post, the first bolt contacting neither the piezoplates nor the post; and
   a second metal bolt passing through each of the second bores and clamping each of the piezoplates and seismic masses to the post, the second bolt contacting neither the piezoplates nor the post.

4. The accelerometer of claim 3, further comprising:
   an electrical connection between the first bolt and a first electric terminal;
   an electrical connection between the second bolt and the first electric terminal; and
   an electrical connection between the body and a second electrical terminal, such that an electrical instrument can read a signal from between the first and second electrical terminals.

5. The accelerometer according to claim 3, wherein each bolt has a smaller diameter than diameter of the bores on the post so as to create a non-contact annulus therebetween.

6. The accelerometer according to claim 1, wherein each piezoplate is a shear type quartz piezoplate.

7. The accelerometer according to claim 1, wherein the piezoplates have equal dimensions.

8. The accelerometer according to claim 1, wherein the posts and the body are metal.

9. The accelerometer according to claim 1 wherein the body and the posts are formed as a monolithic, one-piece, metal structure.

10. The accelerometer according to claim 1 wherein the piezoplates are quartz.

11. The accelerometer according to claim 3 wherein a total of mass of the seismic masses and piezoplates of each linear accelerometer is substantially the same.

12. The accelerometer according to claim 1, further comprising a common housing enclosing the first and second linear accelerometers.

13. The rotational accelerometer of claim 1, including:
   third and fourth spaced-apart linear accelerometers each having first and second piezoplates and corresponding first and second seismic mass clamped to a corresponding post; the piezoplates of each of the third and fourth linear accelerometer having axis of sensitivity parallel to the first axes and being electrically connected to be sensitive to linear acceleration along the parallel first axes;
   each of the post being connected to a body so that the first axes of both of the third and fourth linear accelerometers are parallel; and
   the polarity of the third and fourth linear accelerometers being opposed and electrically connected to be sensitive in combination to rotational acceleration about a third axis orthogonal to the first and second axes.

14. The rotational accelerometer of claim 13, wherein the posts of the third and fourth linear accelerometers are substantially collinear and extend substantially orthogonally from the body and orthogonal to the post of the first and second linear accelerometers.

15. The rotational accelerometer of claim 13, wherein:
   the post, the piezoplates, and the seismic masses of the first linear accelerometer each have a first bore therein;
   the post, the piezoplates, and the seismic masses of the second linear accelerometer each have a second bore therein;
   a first metal bolt extending through each of the first bores and clamping each of the piezoplates and seismic masses to the post, the first bolt contacting neither the piezoplates nor the post;
   a second metal bolt passing through each of the second bores and clamping each of the piezoplates and seismic masses to the post, the second bolt contacting neither the piezoplates nor the post;
   the post, the piezoplates, and the seismic masses of the third linear accelerometer each have a third bore therein;
   the post, the piezoplates, and the seismic masses of a fourth linear accelerometer each have a fourth bore therein;
   a third metal bolt extends through each of the third bores and clamps each of the piezoplates and seismic masses to the post, the third metal bolt contacting neither the piezoplates nor the post; and
   a fourth metal bolt passing through each of the fourth bores and clamping each of the piezoplates and seismic masses to the post, the fourth bolt contacting neither the piezoplates nor the post.

16. The accelerometer of claim 15, further comprising:
   an electrical connection between the first bolt and a first electric terminal;
   an electrical connection between the second bolt and the first electric terminal;
   an electrical connection between the body and a second electrical terminal, such that an electrical instrument can read a signal from between the first and second electrical terminals;

an electrical connection between the third metal bolt and a third electric terminal;

an electrical connection between either the fourth bolt or one of the masses of the fourth linear accelerometer and the third electric terminal; and an electrical connection to a second electric terminal, the second electric terminal comprising a ground, enabling an electrical instrument to read a signal from between the second and third electric terminals.

17. The accelerometer as in claim 16, wherein the first, second, third and fourth linear accelerometer's posts are metal and are electrically connected to one another.

18. The accelerometer of claim 17, wherein the body, as well as the posts are all formed as a monolithic, one-piece metal structure.

19. The rotational accelerometer of claim 1, including:

third, fourth, fifth and sixth spaced-apart linear accelerometers each having first and second piezoplates and corresponding first and second seismic mass clamped to a corresponding post;

the piezoplates of each of the third and fourth linear accelerometers having axis of sensitivity parallel to the second axis and being electrically connected to be sensitive to linear acceleration along the second parallel axes;

the piezoplates of each of the fifth and sixth linear accelerometers having axis of sensitivity parallel to the third axis and being electrically connected to be sensitive to linear acceleration along the parallel third axes;

each of the post of the third and fourth linear accelerometers being connected to a body so that the parallel second axes of both of the third and fourth linear accelerometers are parallel;

each of the post fifth and sixth linear accelerometers being connected to a body so that the parallel third axes of both of the fifth and sixth linear accelerometers are parallel;

the polarity of the third and fourth linear accelerometers being opposed and electrically connected to be sensitive in combination to rotational acceleration about the third axis; and the polarity of the fifth and sixth linear accelerometers being opposed and electrically connected to be sensitive in combination to rotational acceleration about the first axis.

20. The rotational accelerometer of claim 19, wherein the posts of the third and fourth linear accelerometers are substantially collinear; the posts of the fifth and sixth linear accelerometers are substantially collinear; and the posts of the third and fourth linear accelerometers, the posts of the fifth and sixth linear accelerometers and the post of the first and second linear accelerometers are substantially mutually orthogonal.

21. The rotational accelerometer of claim 19, wherein:

the post, the piezoplates, and the seismic masses of the first linear accelerometer each have a first bore therein;

the post, the piezoplates, and the seismic masses of the second linear accelerometer each have a second bore therein;

a first metal bolt extending through each of the first bores and clamping each of the piezoplates and seismic masses to the post, the first bolt contacting neither the piezoplates nor the post;

a second metal bolt passing through each of the second bores and clamping each of the piezoplates and seismic masses to the post, the second bolt contacting neither the piezoplates nor the post;

the post, the piezoplates, and the seismic masses of the third linear accelerometer each have a third bore therein;

the post, the piezoplates, and the seismic masses of the fourth linear accelerometer each have a fourth bore therein;

a third metal bolt extends through each of the third bores and clamps the piezoplates and seismic masses to the post, the third metal bolt contacting neither the piezoplates nor the post;

a fourth metal bolt passing through each of the fourth bores and clamping the piezoplates and seismic masses to the post, the fourth bolt contacting neither the piezoplates nor the post;

the post, the piezoplates, and the seismic masses of the fifth linear accelerometer each have a fifth bore therein;

the post, the piezoplates, and the seismic masses of the sixth linear accelerometer each have a sixth bore therein; and, a fifth metal bolt extends through each of the fifth bores and clamps the piezoplates and seismic masses to the post, the fifth metal bolt contacting neither the piezoplates nor the post;

a sixth metal bolt passes through each of the fifth bores and clamps the piezoplates and seismic masses to the post, the sixth bolt contacting neither the piezoplates nor the post.

22. The accelerometer of claim 21, further comprising:

an electrical connection between the first bolt and a first electric terminal;

an electrical connection between the second bolt and the first electric terminal;

an electrical connection between the body and a second electrical terminal, enabling an electrical instrument to read the signal from between the first and second electrical terminals;

an electrical connection between the third metal bolt and a third electric terminal;

an electrical connection between either the fourth bolt or one of the masses of the fourth linear accelerometer and the third electric terminal, enabling an electrical instrument to read the signal from between the second and third electric terminals;

an electrical connection from the fifth bolt to a fourth electrical terminal;

an electrical connection from the sixth bolt to the fourth electrical terminal, enabling an electrical instrument to read the signal from between the fourth and second electric terminals.

23. The accelerometer as in claim 21, wherein the posts are metal and electrically interconnected with one another.

24. The accelerometer as in claim 21, wherein the body and each of the posts are a monolithic, one-piece metal structure.

25. A method of calibrating a rotational accelerometer comprising the steps of:

selecting a pair of first piezoelectric plates, a pair of first seismic masses, and one first bolt;

selecting a pair of second piezoelectric plates, a pair of second seismic mass, and one second bolt;

ensuring that the total weight of the first plates, the first bolt, and the first seismic masses is equal to the total weight of the second piezoplates, the second bolt, arid the second seismic masses;

constructing a first shear-type linear accelerometer from the first piezoplates and the first seismic masses;

constructing a second shear-type linear accelerometer from the second piezoplates and the second seismic masses;

aligning the first and second linear accelerometers on a body to have opposed polarity and parallel axes of sensitivity; and electrically connecting the linear accelerometers to a common port so as to measure in combination angular acceleration about an axis perpendicular to the axes of sensitivity.

26. The method of claim 25, wherein the piezoelectric plates are selected to be shear plates made of quartz.

* * * * *